United States Patent
Lin et al.

(10) Patent No.: US 10,237,602 B2
(45) Date of Patent: Mar. 19, 2019

(54) METHODS AND SYSTEMS FOR SELECTING CONTENT FOR A PERSONALIZED VIDEO

(71) Applicant: FACEBOOK, INC., Menlo Park, CA (US)

(72) Inventors: Boyan Lin, Menlo Park, CA (US); Peter Tuchen Lai, Mountain View, CA (US); Jia Lu, Fremont, CA (US); Shu Wu, Seattle, WA (US); Can Cui, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 55 days.

(21) Appl. No.: 15/365,827

(22) Filed: Nov. 30, 2016

(65) Prior Publication Data

US 2018/0152746 A1    May 31, 2018

(51) Int. Cl.
| | |
|---|---|
| *H04N 21/2668* | (2011.01) |
| *G11B 27/031* | (2006.01) |
| *H04N 21/258* | (2011.01) |
| *H04N 21/25* | (2011.01) |
| *H04N 21/4788* | (2011.01) |
| *H04N 21/475* | (2011.01) |
| *H04N 21/431* | (2011.01) |
| *H04N 21/234* | (2011.01) |
| *H04N 21/442* | (2011.01) |
| *H04N 21/81* | (2011.01) |
| *H04N 21/8549* | (2011.01) |

(52) U.S. Cl.
CPC ....... *H04N 21/2668* (2013.01); *G11B 27/031* (2013.01); *H04N 21/23418* (2013.01); *H04N 21/252* (2013.01); *H04N 21/25891* (2013.01); *H04N 21/4312* (2013.01); *H04N 21/44213* (2013.01); *H04N 21/4755* (2013.01); *H04N 21/4788* (2013.01); *H04N 21/8153* (2013.01); *H04N 21/8549* (2013.01)

(58) Field of Classification Search
CPC ............ H04N 21/2668; H04N 21/252; H04N 21/25891; H04N 21/4312; H04N 21/4755; H04N 21/4788
See application file for complete search history.

(56) References Cited

U.S. PATENT DOCUMENTS

| | | | | |
|---|---|---|---|---|
| 5,286,202 A | * | 2/1994 | de Gyarfas | G09B 9/302 |
| | | | | 345/634 |
| 2009/0033758 A1 | * | 2/2009 | Nishiyama | G06K 9/6253 |
| | | | | 348/222.1 |
| 2012/0281887 A1 | * | 11/2012 | Yamaguchi | G06F 17/3025 |
| | | | | 382/118 |
| 2013/0095857 A1 | * | 4/2013 | Garcia | H04W 4/02 |
| | | | | 455/456.3 |

(Continued)

*Primary Examiner* — Joshua D Taylor
(74) *Attorney, Agent, or Firm* — Morgan, Lewis & Bockius LLP

(57) ABSTRACT

A method of generating a personalized video for a user of a social networking service. For a plurality of images associated with the user, respective first metrics are determined for respective images of the plurality of images based on one or more predefined image-content criteria, a first set of images is selected from the plurality of images based at least in part on the respective first metrics, and the personalized video is populated with the first set of images. The method further includes providing the personalized video to the user for viewing.

19 Claims, 12 Drawing Sheets

(56) References Cited

U.S. PATENT DOCUMENTS

| | | | |
|---|---|---|---|
| 2013/0117692 A1* | 5/2013 | Padmanabhan | H04N 21/4126 715/753 |
| 2014/0304019 A1* | 10/2014 | Scott | G06Q 10/063114 705/7.15 |
| 2015/0302536 A1* | 10/2015 | Wahl | G06Q 50/00 705/2 |
| 2015/0363409 A1* | 12/2015 | Wood | G06F 17/30058 707/738 |
| 2016/0104509 A1* | 4/2016 | Loscalzo | G06F 17/30256 386/290 |
| 2016/0189407 A1* | 6/2016 | Hodgson | G06T 11/60 715/204 |

* cited by examiner

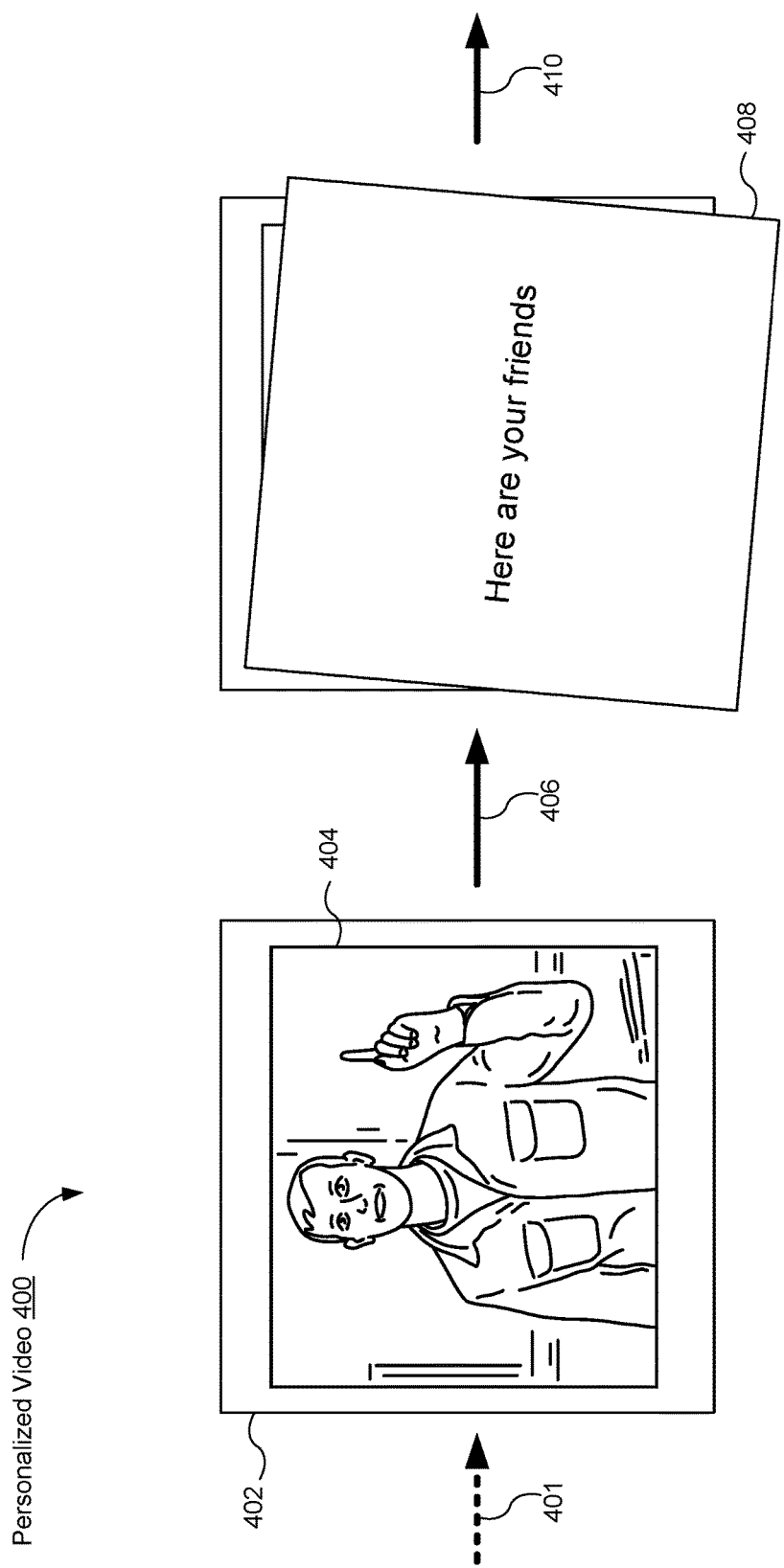

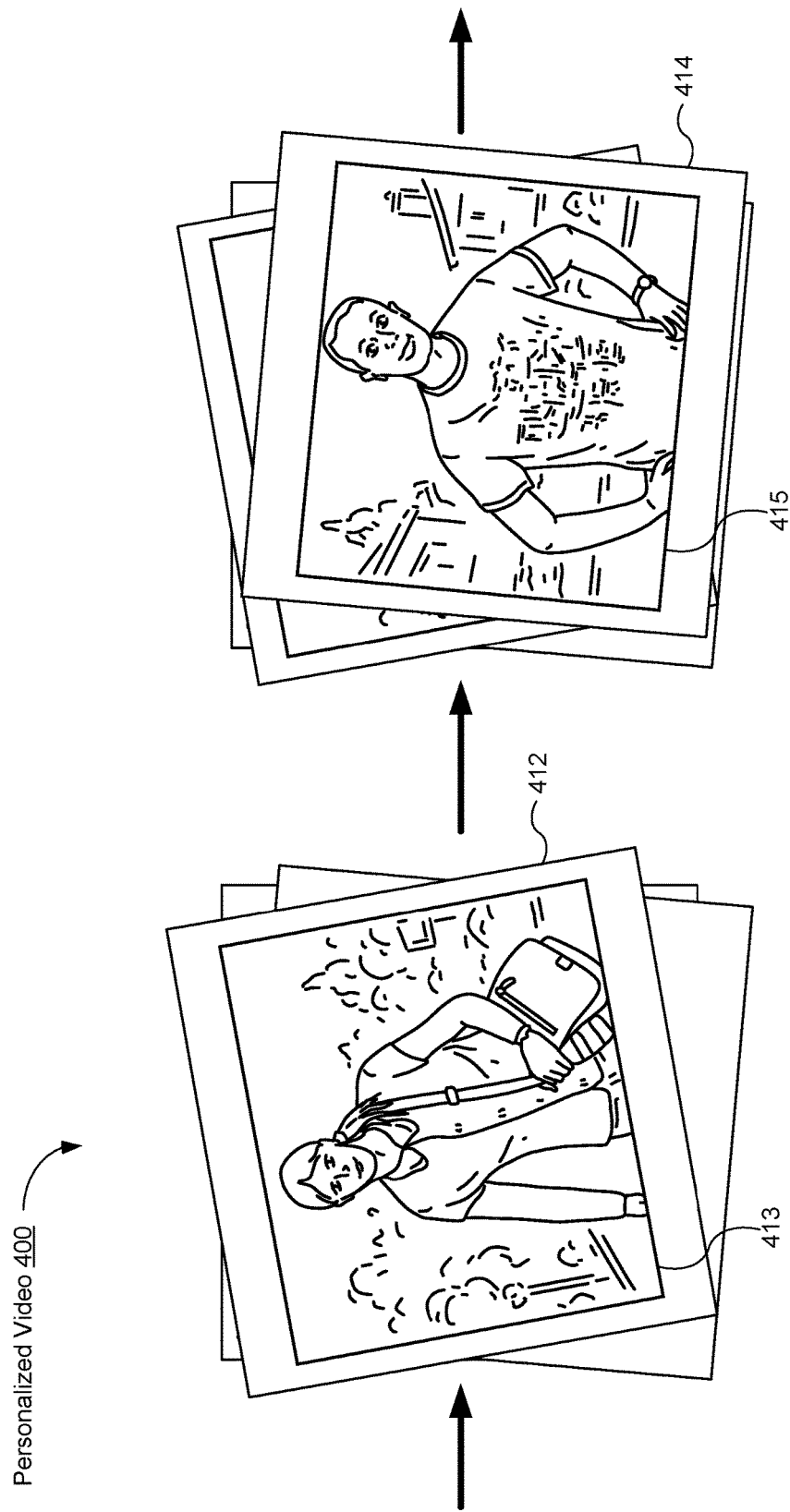

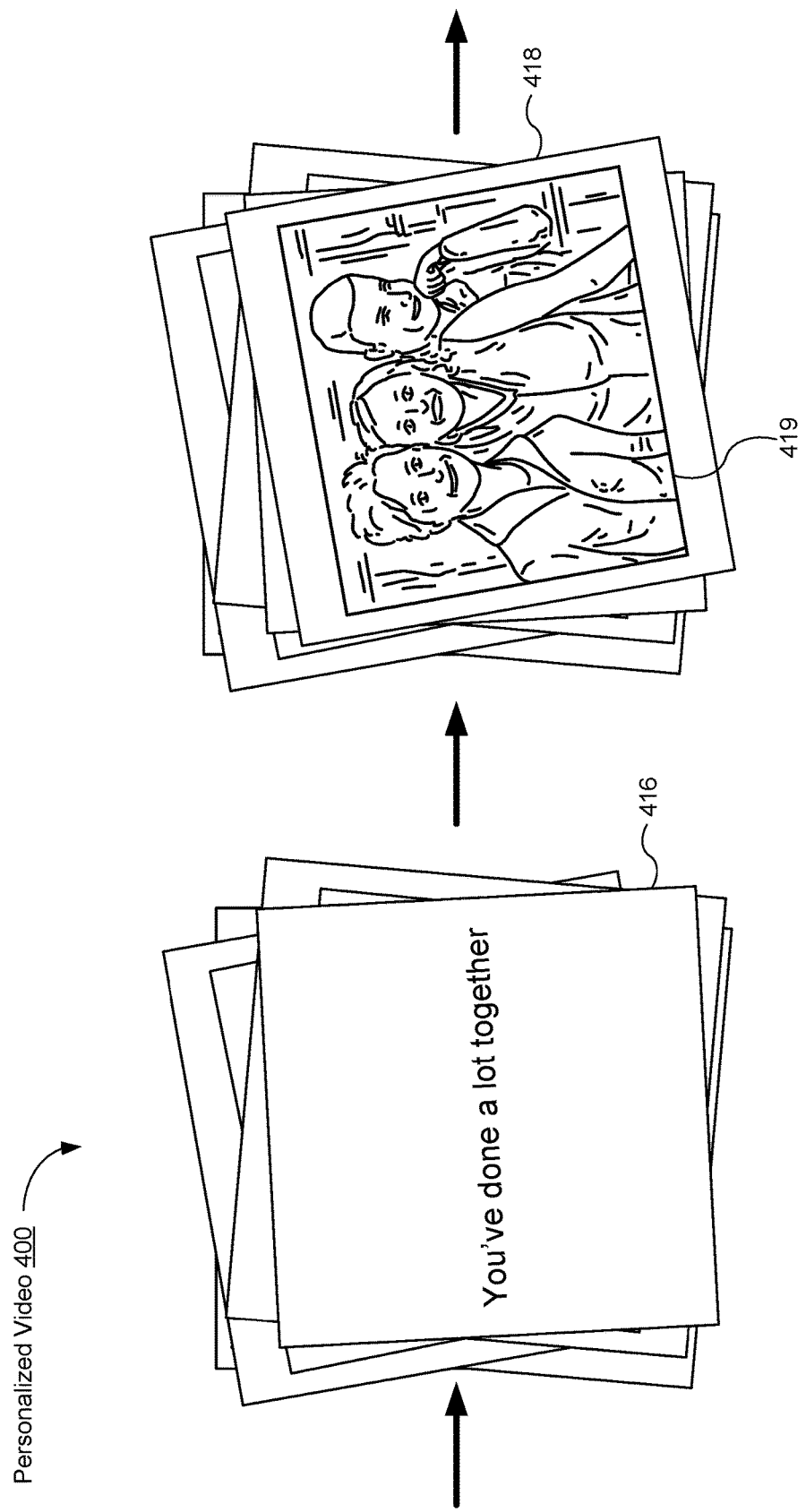

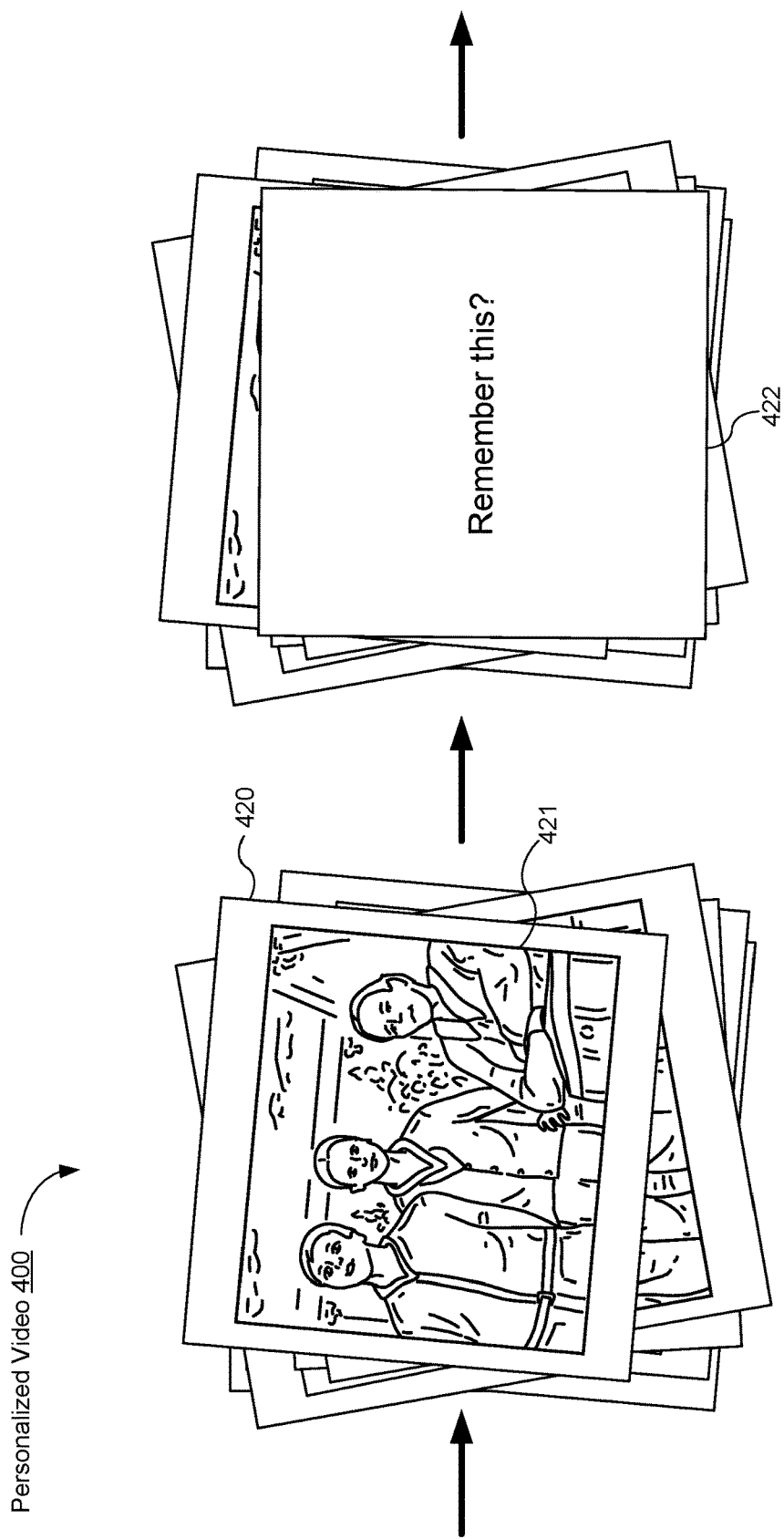

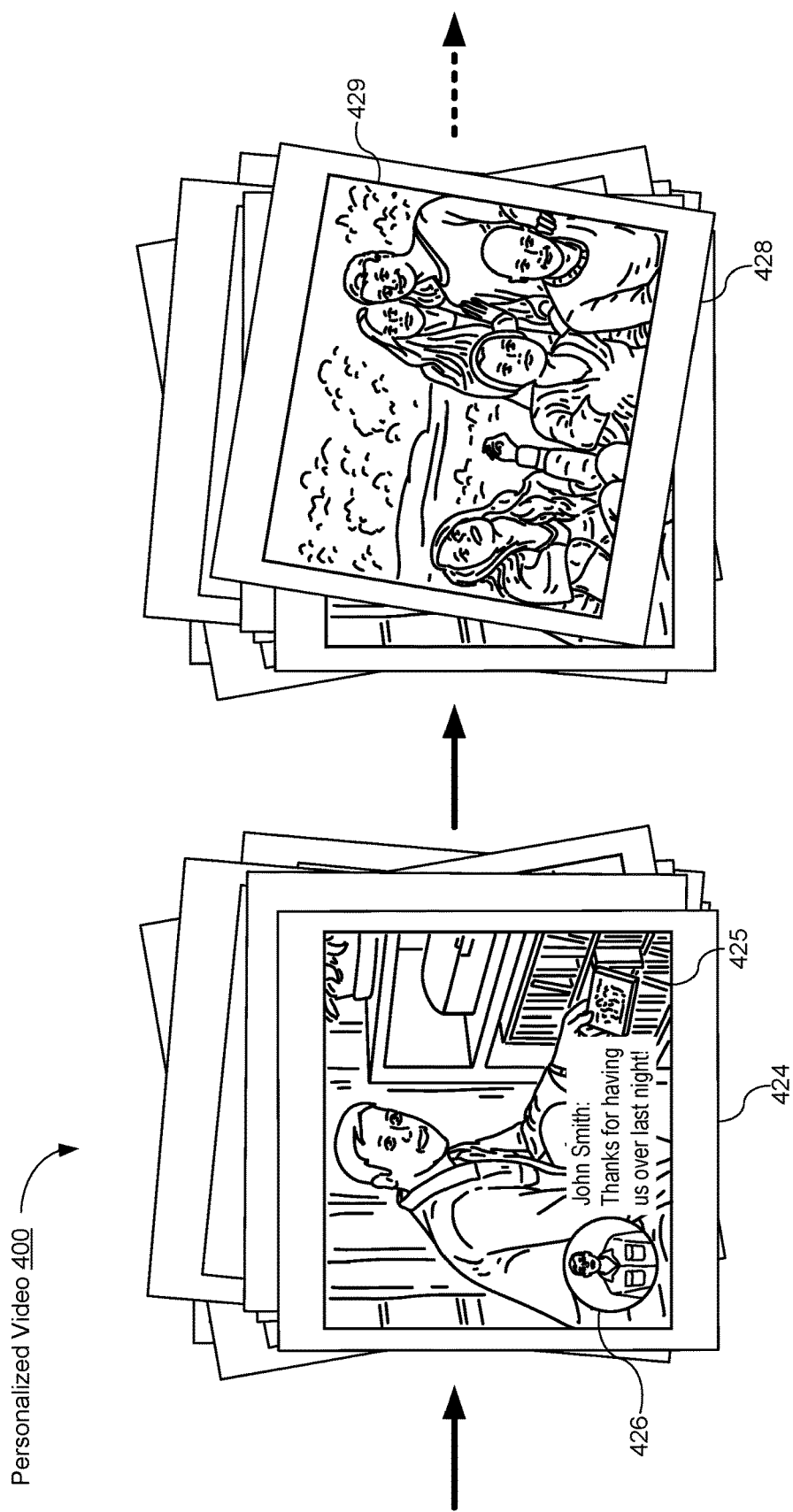

METHODS AND SYSTEMS FOR SELECTING CONTENT FOR A PERSONALIZED VIDEO

TECHNICAL FIELD

This relates generally to generating a personalized video, including but not limited to selecting content for the personalized video.

BACKGROUND

Social networking services provide a convenient means for users of the social networking service to share information (e.g., posting an image). Social networking services may, on occasion, select and generate content for their users. Selecting the content, however, can be expensive and inefficient, and subject to both human and machine-based inaccuracies.

SUMMARY

Accordingly, there is a need for methods and systems for generating and selecting the content (e.g., selecting content for a personalized video). Determining metrics for a plurality of images associated with a user of the social networking service can improve the selecting of content for the personalized video. Such methods and systems provide the social networking services with processes to select specific images from the plurality of images using the metrics (e.g., a first metric and/or a second metric).

In accordance with some embodiments, a method is performed at a server system having processors and memory storing instructions for execution by the processors. The method includes generating a personalized video for a user of a social networking service, comprising, for a plurality of images associated with the user determining respective first metrics for respective images of the plurality of images based on one or more predefined image-content criteria, selecting a first set of images from the plurality of images based at least in part on the respective first metrics, and populating the personalized video with the first set of images. The method further includes providing the personalized video to the user for viewing.

In accordance with some embodiments, a server system includes one or more processors/cores, memory, and one or more programs; the one or more programs are stored in the memory and configured to be executed by the one or more processors/cores and the one or more programs include instructions for performing the operations of the method described above. In accordance with some embodiments, a computer-readable storage medium has stored therein instructions which when executed by one or more processors/cores of a server system, cause the server system to perform the operations of the method described above.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 4A-4J illustrate exemplary graphical user interfaces (GUIs) of a personalized video for a user of a social networking system on a client device, in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first metric could be termed a second metric, and, similarly, a second metric could be termed a first metric, without departing from the scope of the various described embodiments. The first metric and the second metric are both metrics, but they are not the same metric.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
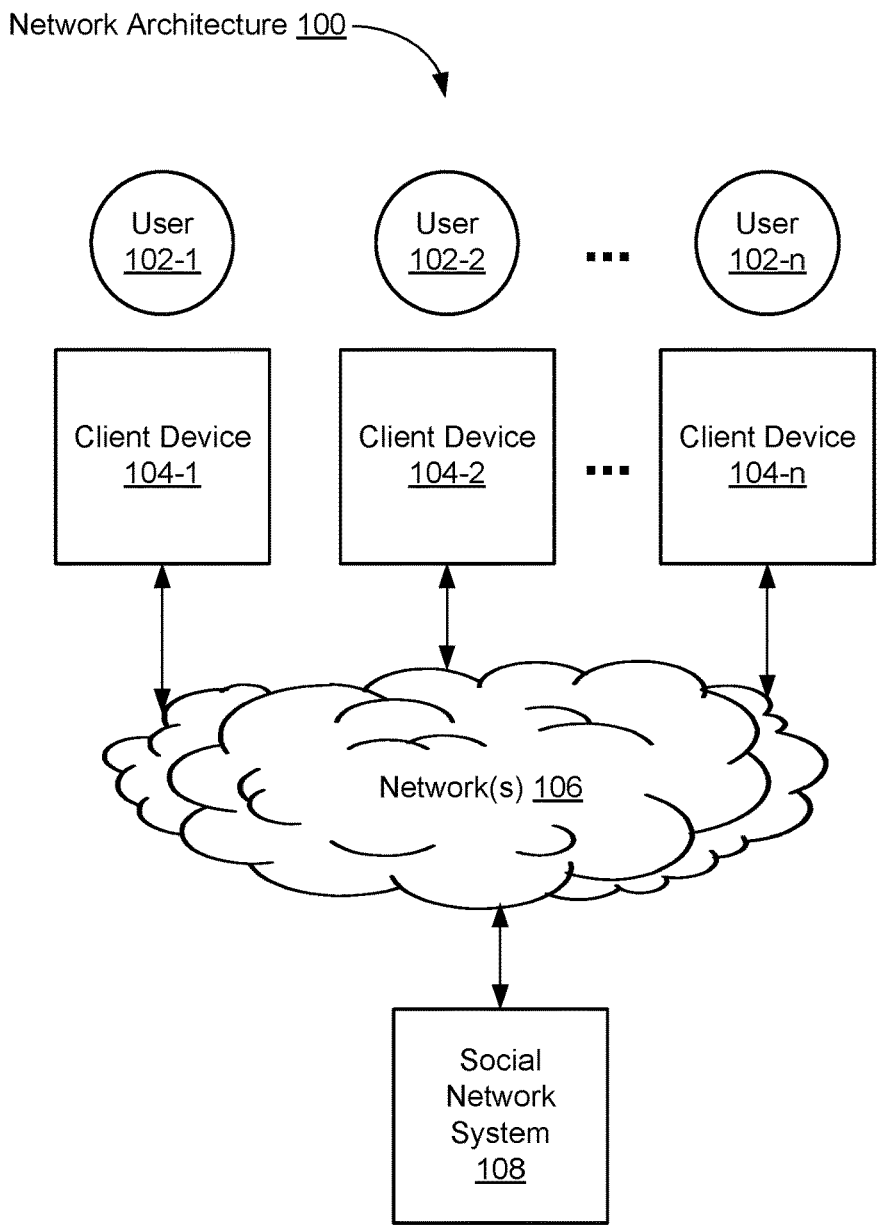
FIG. 1 is a block diagram illustrating an exemplary network architecture of a social network in accordance with some embodiments.

FIG. 1 is a block diagram illustrating an exemplary network architecture of a social network in accordance with some embodiments. The network architecture 100 includes a number of client devices (also called "client systems," "client computers," or "clients") 104-1, 104-2, . . . 104-n communicably connected to a social network system 108 (also referred to herein as a social networking system) by one or more networks 106.

In some embodiments, the client devices 104-1, 104-2, . . . 104-n are computing devices such as smart watches, personal digital assistants, portable media players, smart phones, tablet computers, 2D gaming devices, 3D gaming devices, virtual reality devices, laptop computers, desktop computers, televisions with one or more processors embedded therein or coupled thereto, in-vehicle information systems (e.g., an in-car computer system that provides navigation, entertainment, and/or other information), or other appropriate computing devices that can be used to communicate with an electronic social network system and other computing devices (e.g., via the electronic social network system). In some embodiments, the social network system 108 is a single computing device such as a computer server, while in other embodiments, the social network system 108 is implemented by multiple computing devices working together to perform the actions of a server system (e.g., cloud computing). In some embodiments, the network 106 is a public communication network (e.g., the Internet or a cellular data network), a private communications network (e.g., private LAN or leased lines), or a combination of such communication networks.

Users 102-1, 102-2, . . . 102-n employ the client devices 104-1, 104-2, . . . 104-n to access the social network system 108 and to participate in a social networking service. For example, one or more of the client devices 104-1, 104-2, . . . 104-n execute web browser applications that can be used to access the social networking service. As another example, one or more of the client devices 104-1, 104-2, . . . 104-n execute software applications that are specific to the one or more social networks (e.g., social networking "apps" running on smart phones or tablets, such as a Facebook social networking application, a messaging application, etc., running on an iPhone, Android, or Windows smart phone or tablet).

Users interacting with the client devices 104-1, 104-2, . . . 104-n can participate in the social networking service provided by the social network system 108 by providing and/or consuming (e.g., posting, writing, viewing, publishing, broadcasting, promoting, recommending, sharing) information, such as text comments (e.g., statuses, updates, announcements, replies, location "check-ins," private/group messages), digital content (e.g., photos (i.e., images), videos, audio files, links, documents), and/or other electronic content. In some embodiments, users provide information to a page, group, message board, feed, and/or user profile of a social networking service provided by the social network system 108. Users of the social networking service can also annotate information posted by other users of the social networking service (e.g., endorsing or "liking" a posting of another user, commenting on a posting by another user, or sharing a posting of another user).

In some embodiments, information can be posted on a user's behalf by systems and/or services external to the social network or the social network system 108. For example, the user may post a review of a movie to a movie review website, and with proper permissions that website may cross-post the review to the social network on the user's behalf. In another example, a software application executing on a mobile client device, with proper permissions, may use a global navigation satellite system (GNSS) (e.g., global positioning system (GPS), GLONASS, etc.) or other geo-location capabilities (e.g., Wi-Fi or hybrid positioning systems) to determine the user's location and update the social network with the user's location (e.g., "At Home," "At Work," or "In San Francisco, Calif."), and/or update the social network with information derived from and/or based on the user's location. Users interacting with the client devices 104-1, 104-2, . . . 104-n can also use the social network provided by the social network system 108 to define groups of users. Users interacting with the client devices 104-1, 104-2, . . . 104-n can also use the social network provided by the social network system 108 to communicate (e.g., using a messaging application or built-in feature) and collaborate with each other.

In some embodiments, the network architecture 100 also includes third-party servers (not shown). In some embodiments, third-party servers are associated with third-party service providers who provide services and/or features to users of a network (e.g., users of the social network system 108, FIG. 1).

Figure 2:
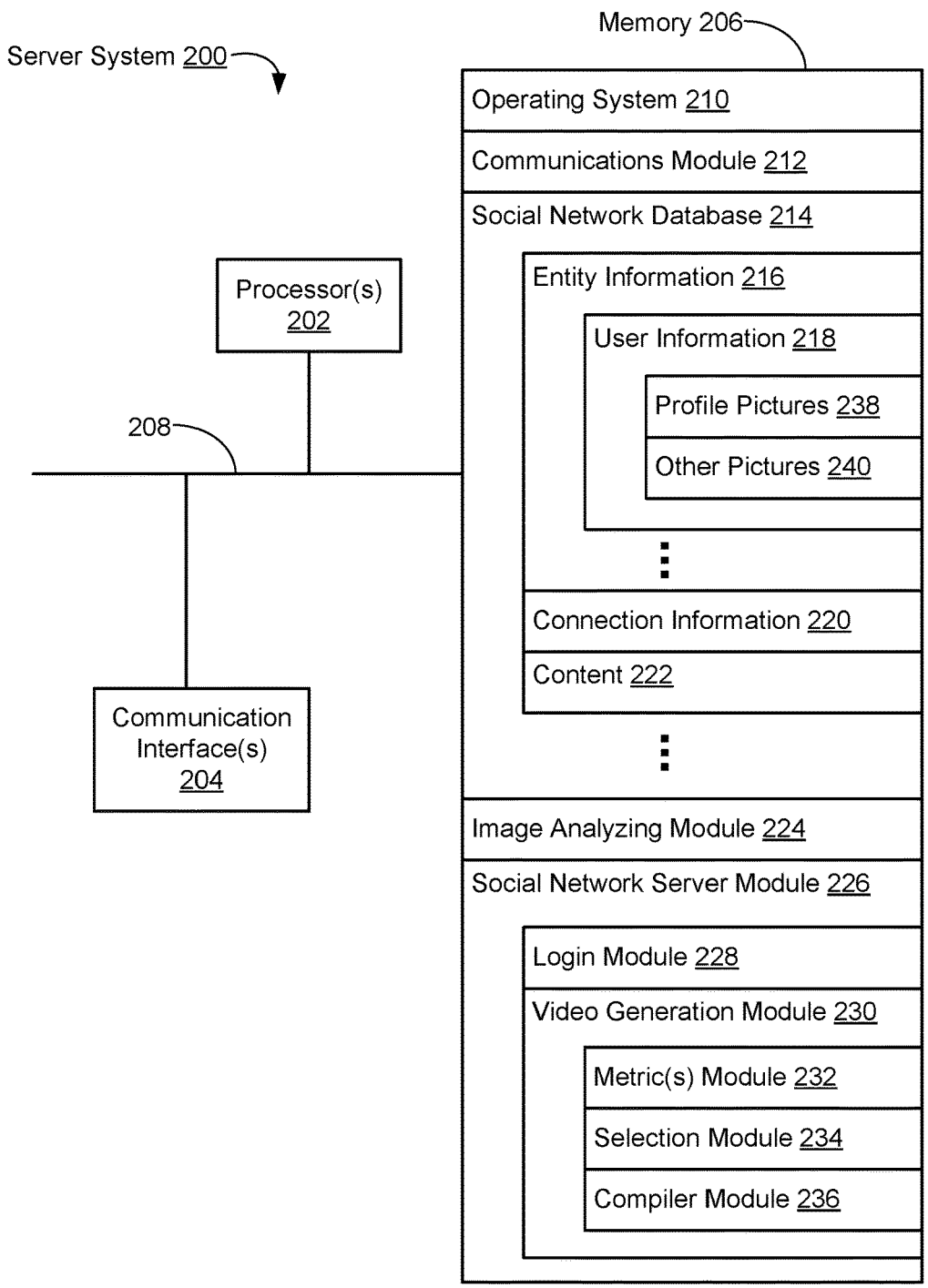
FIG. 2 is a block diagram illustrating an exemplary server system in accordance with some embodiments.

FIG. 2 is a block diagram illustrating an exemplary server system 200 in accordance with some embodiments. In some embodiments, the server system 200 is an example of a social network system 108. The server system 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The server system 200 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 3:
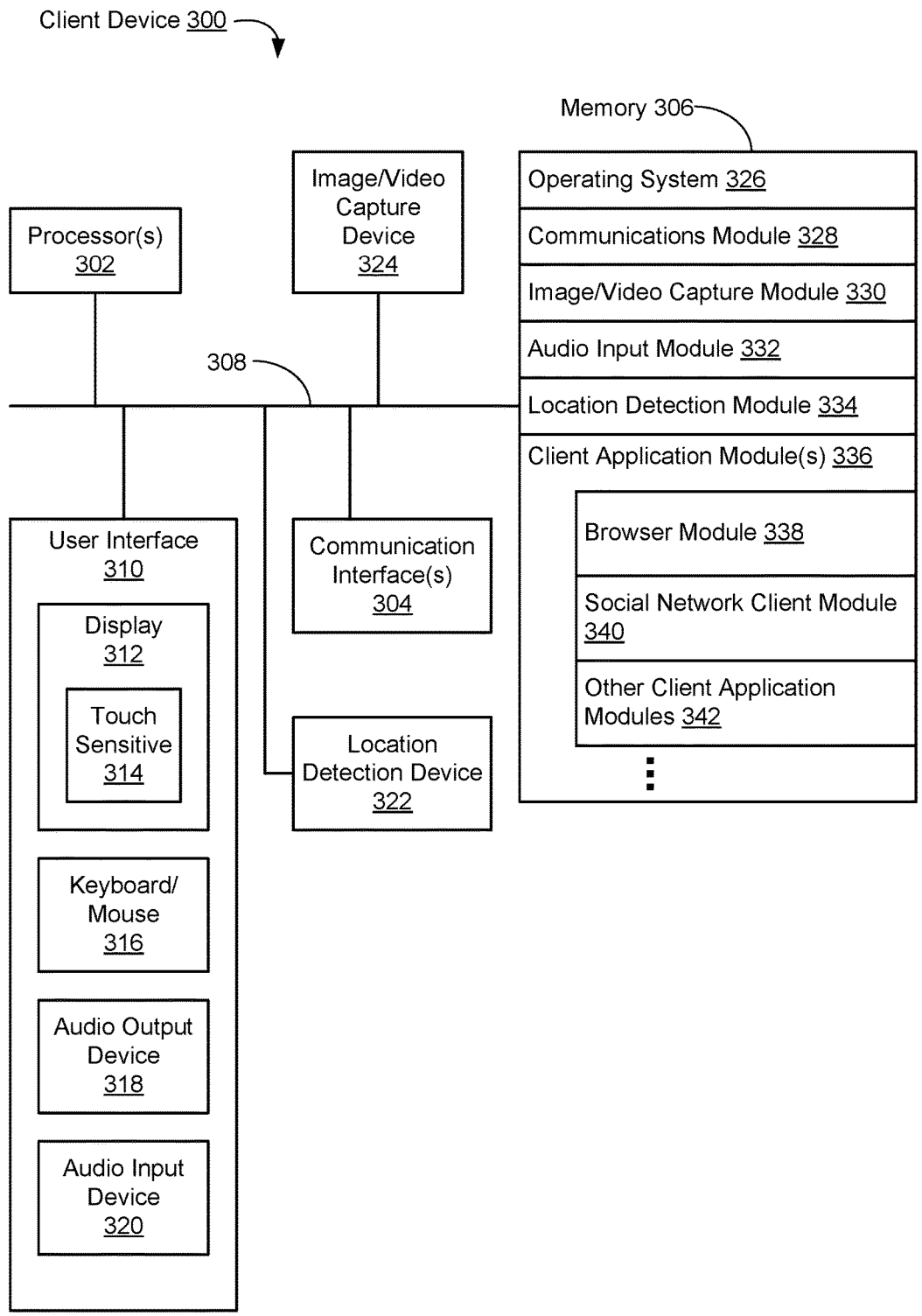
FIG. 3 is a block diagram illustrating an exemplary client device, in accordance with some embodiments.
Figure 5A:
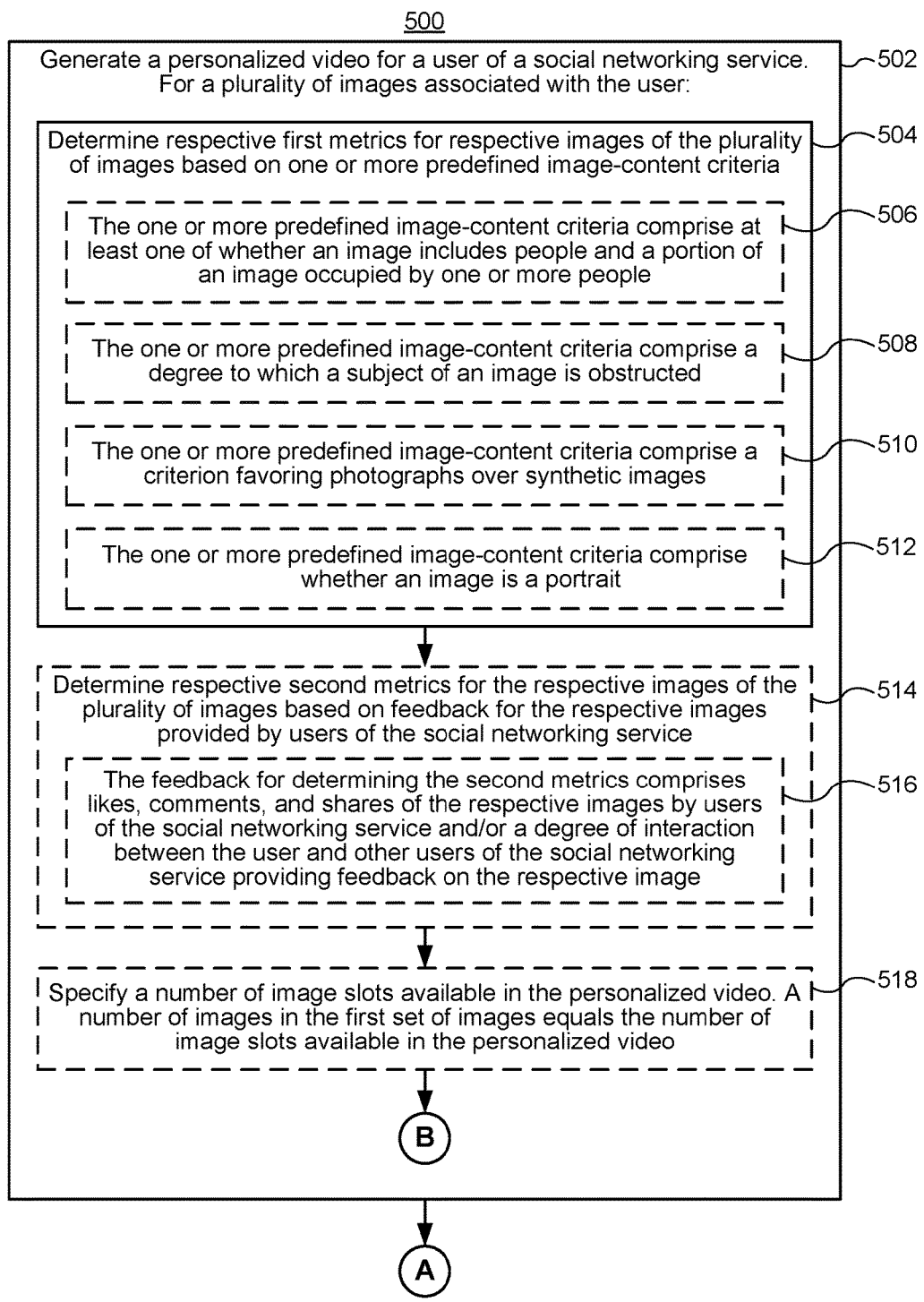
FIGS. 5A-5D are flow diagrams illustrating a method of generating a personalized video for a user of a social networking system, in accordance with some embodiments.
Figure 5B:
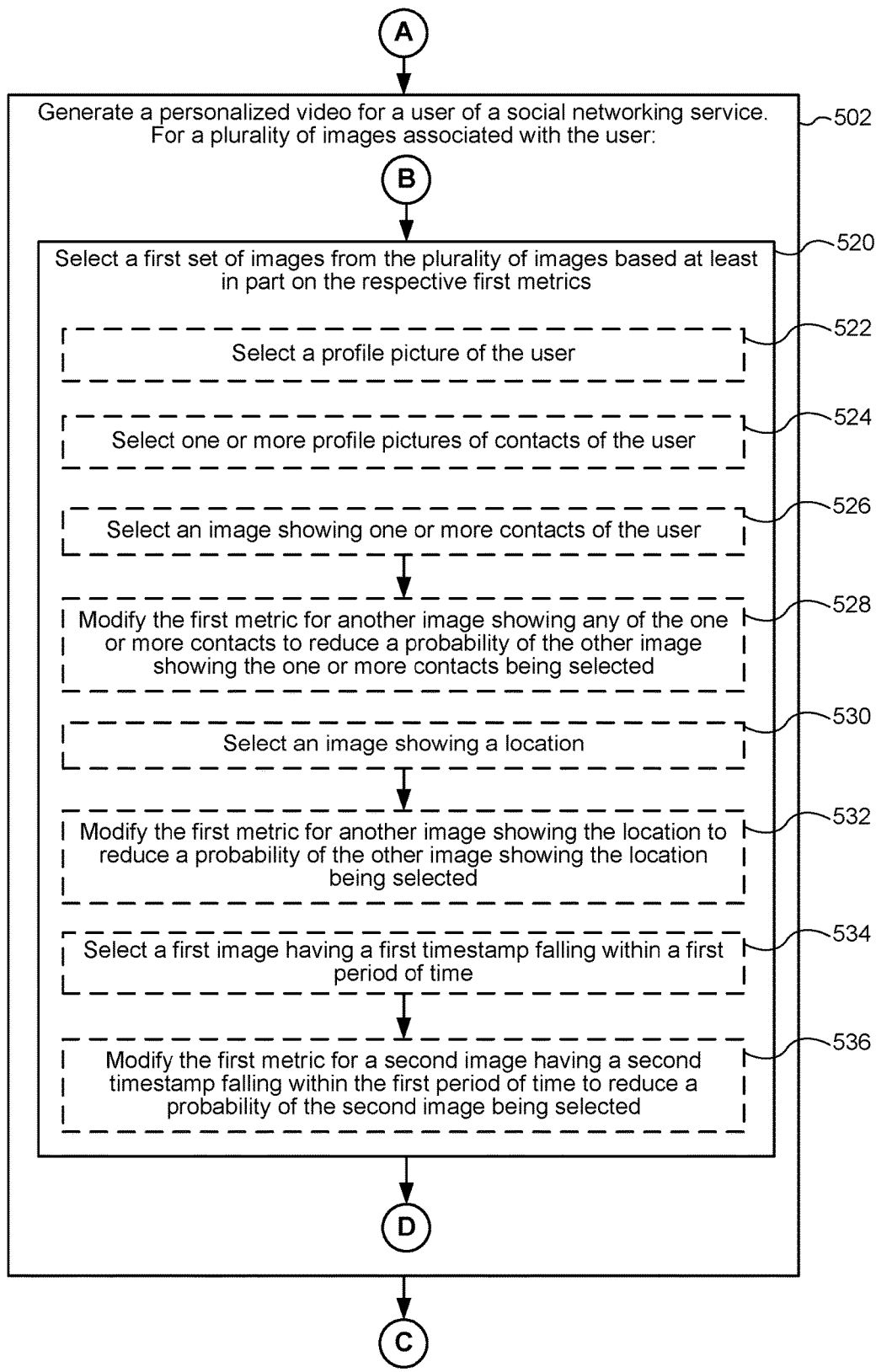
Figure 5C:
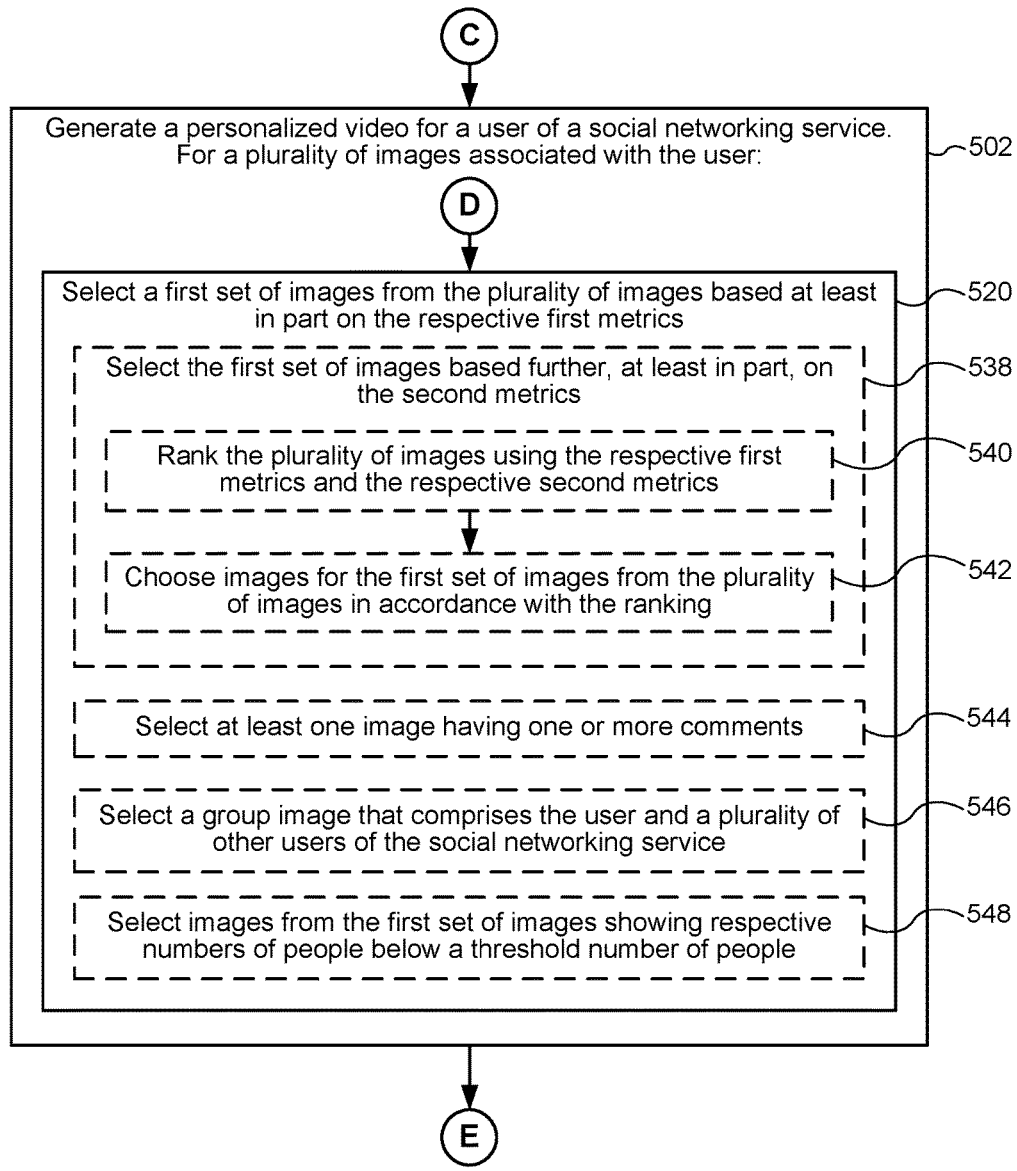
Figure 5D:
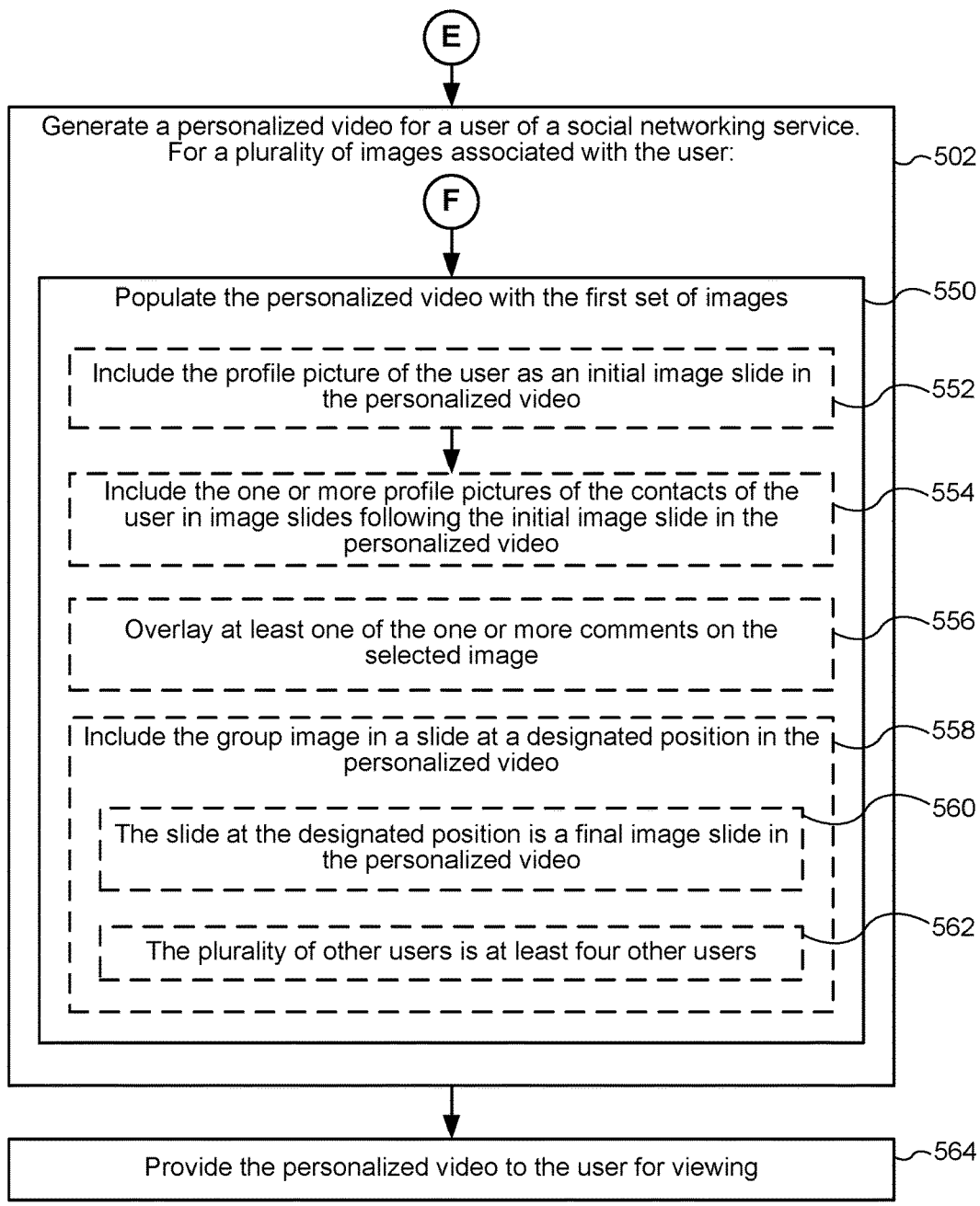

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer readable storage medium. In some embodiments, memory 206 or the computer readable storage medium of memory 206 stores the following programs, modules, and data structures, or a subset or superset thereof:

- an operating system 210 that includes procedures for handling various basic system services and for performing hardware dependent tasks;
- a network communication module 212 that is used for connecting server system 200 (e.g., social network system 108, FIG. 1) to other computers (e.g., client devices 104-1, 104-2, . . . 104-n, and/or third party servers) via the one or more communication network interfaces 204 (wired or wireless) and one or more communication networks, such as the Internet, cellular telephone networks, mobile data networks, other wide area networks, local area networks, metropolitan area networks, and so on;
- a social network database 214 for storing data associated with the social networking service, such as:

entity information 216, such as user information 218, which includes user profile pictures 242 and other pictures associated with the user 244;
connection information 220; and
user content 222;
image analysis module 224 that operates upon images received by the server system 200 to detect and/or track subjects (e.g., people, pets, and other objects) in the images;
a social network server module 226 for providing social networking services and related features (e.g., in conjunction with social network client module 340 on the client device 104, FIG. 3), which includes:
a login module 228 for logging a user 102 at a client device 104 into the social network system 108;
a video generator module 230 for generating a personalized video for the user 102 and providing the personalized video to a client device 104 of the user 102, which includes:
metric(s) module 232 for determining a metric (e.g., a score) for respective images associated with the user 102;
selection module 234 for selecting images to include in the personalized video for the user 102; and
compiler module 236 for compiling the images, along with text slides, to generate the personalized video for the user 102.

The server database 214 stores data associated with the server system 200 in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, user profile pictures, other pictures associated with the user (e.g., images where the user has been tagged or identified by image analysis software), a plurality of icons, login information, payment credentials (e.g., credit-card or debit-card information, bank information, etc. for conducting financial transactions through the social networking service), privacy and other preferences, biographical data, and the like. In some embodiments, for a given user, the user information 218 includes the user's name, profile picture, a plurality of icons, contact information, birth date, sex, marital status, family status, employment, education background, preferences, interests, and/or other demographic information. In some embodiments, the user information may include other information, such as likes and comments, associated with say, profile pictures of the user (or other photos of the user).

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. For example, entity information 216 may include a location tag (e.g., Lake Tahoe, Calif., USA) for one or more digital photos. In some embodiments, the resource is located in the social network system 108 (e.g., in content 222) or on an external server, such as a third-party server (not shown).

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes (e.g., also referred to herein as a contact).

In some embodiments, an edge includes or represents one or more data objects or attributes that correspond to the relationship between a pair of nodes. For example, when a first user indicates that a second user is a "friend" of the first user, the social network system 108 transmits a "friend request" to the second user. If the second user confirms the "friend request," the social network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information 220 about a particular action or activity performed by a user of the user node towards the other entity node. For example, a user may "like" or have "attended," "played," "listened," "cooked," "worked at," "watched," etc. the entity at the other node. The page in the social networking service that corresponds to the entity at the other node may include, for example, a selectable "like," "check in," "add to favorites," etc. icon. After the user clicks one of these icons, the social network system 108 may create a "like" edge, "check in" edge, a "favorites" edge, etc. in response to the corresponding user action. As another example, the user may listen to a particular song using a particular application (e.g., an online music application). In this case, the social network system 108 may create a "listened" edge and a "used" edge between the user node that corresponds to the user and the entity nodes that correspond to the song and the application, respectively, to indicate that the user listened to the song and used the application. In addition, the social network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., script for API calls), podcasts, links, and the like.

FIG. 3 is a block diagram illustrating an exemplary client device 300, in accordance with some embodiments. The client device 300 is an example of the one or more client devices 104-1, 104-2, . . . 104-n (FIG. 1). The client device 300 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 300 includes a user interface 310. The user interface 310 typically includes a display device 312. In some embodiments, the client device 300 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., continuous gestures in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 300 use a microphone and voice recognition to supplement or replace the keyboard. Optionally, the client device 300 includes an audio input device 320 (e.g., a microphone) to capture audio (e.g., speech from a user). Optionally, the client device 300 includes a location detection device 322, such as a GNSS (e.g., GPS, GLONASS, etc.) or other geo-location receiver, for determining the location of the client device 300. The client device 300 also optionally includes an image/video capture device 324, such as a camera and/or a webcam.

In some embodiments, the client device 300 includes one or more optional sensors (e.g., gyroscope, accelerometer) for detecting motion and/or a change in orientation of the client device. In some embodiments, the detected motion and/or orientation of the client device 300 (e.g., the motion/change in orientation corresponding to a user input produced by a user of the client device) is used to manipulate an interface (or content within the interface) displayed on the client device 300. In some embodiments, the one or more optional sensors may include an optical projection sensor for projecting an interface displayed on the client device 300 in 3D (e.g., project 3D hologram). Moreover, a user may manipulate the interface displayed on the client device 300 by interacting with the projected holographic 3D display.

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules, and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social network system 108;
- an audio input module 332 (e.g., a microphone module) for processing audio captured by the audio input device 320, where the respective audio may be sent or streamed (e.g., by a client application module 336) to the social network system 108;
- a location detection module 334 (e.g., a GPS, Wi-Fi, or hybrid positioning module) for determining the location of the client device 104 (e.g., using the location detection device 322) and providing this location information for use in various applications (e.g., social network client module 340); and
- one or more client application modules 336, including the following modules (or sets of instructions), or a subset or superset thereof:
  - a web browser module 338 (e.g., Internet Explorer or Edge by Microsoft, Firefox by Mozilla, Safari by Apple, or Chrome by Google) for accessing, viewing, and interacting with web sites;
  - a social network module 340 for providing an interface to a social networking service (e.g., a social networking service provided by social network system 108) and related features, and for loading (e.g., within the interface for the social network module 340) pages associated with third-party service providers (e.g., to conduct transactions with the third-party service providers); and/or
  - optional client application modules 342, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D gaming, virtual reality, electronic book reader, and/or workout support.

In some embodiments, the location detection module 334 may attach a location to an image captured by the client device 300. For example, if a user 102 of the client device 300 captures an image while in San Francisco, Calif., the client device 300 will attach the location to the captured image (e.g., San Francisco, Calif., will be attached).

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

FIGS. 4A-4J illustrate exemplary graphical user interfaces (GUIs) on a client device for presenting a personalized video to a user of a social networking service in accordance with some embodiments. A social networking system (e.g., social network system 108, FIG. 1; server system 200, FIG. 2) may generate and provide the personalized video to the client device. The client device (e.g., client devices 104-1, 104-2, . . . 104-n, FIG. 1) of a user (e.g., users 102-1, 102-2, . . . 102-n, FIG. 1) may display the personalized video 400. Although not shown in FIGS. 4A-4J, the GUIs are displayed on a display (e.g., display 312, FIG. 3) of the client device (e.g., client device 300, FIG. 3). The user, upon logging into the social networking service, may receive a message to view his or her personalized video. In some embodiments, the personalized video is a personalized slide-show video.

A user of the social networking service may participate in the social networking service of the social networking system by providing (e.g., posting) information, such as images (among other things) to the social networking service. For example, a user may post a plurality of images to the social networking service (e.g., contacts of the user) over a period of time. In another example, users of the social networking service may tag and/or otherwise associate the user in a plurality of images over a period of time. Accordingly, the social networking system may store images associated with the user in a social network database (e.g., social network database 214, FIG. 2). Using image recognition software, the social networking system may analyze the stored images associated with the user and may determine which images of the stored images to include in the personalized video. In some embodiments, the social networking system may determine which images to include in the personalized video, at least in part, by determining respective first metrics for the stored images. Alternatively or in addition, the social networking system may determine which images to include in the personalized video, at least in part, by determining respective second metrics for the stored images.

The social networking system may select a set of images to include in the personalized video from the stored images (e.g., profile pictures 242 and other pictures associated with the user 244, FIG. 2). The set of images may also include other images posted by other users of the social networking service (e.g., profile pictures posted by one or more contacts of the user). The social networking system may evaluate a closeness of relationship (also referred to herein as a degree of interaction) between a respective user of the social networking service and the user when selecting these other images for the set of images. In some embodiments, when evaluating the closeness of relationship, the social networking system may evaluate entity information (e.g., entity information 216, FIG. 2) and connection information (e.g., connection information 220, FIG. 2) for the respective user of the social networking service and the user. For example, the social networking system may determine a number of edges connecting the user (e.g., a first node) and the respective user of the social networking service (e.g., a second node). In this way, the social networking system may select images from the stored images associated with close friends of the user (i.e., the personalized video should include images of the user with his or her friends). Edges and nodes are discussed in further detail above with reference to FIG. 2.

In some embodiments, the respective user of the social networking service is a respective contact of the user. In some embodiments, the social networking system may identify a plurality of contacts of the user to include in profile picture slides of the personalized video, in accordance with the discussion above. For example, the social networking system may select between 2 and 5 profile pictures of contacts of the user to include in the profile picture slides.

In some embodiments, the social networking system may store the other images (e.g., profile pictures of contacts of the user) in the stored images associated with the user (user information 218 of the user, FIG. 2). In some embodiments, the social networking system may store the other images in respective social network databases associated with the respective contacts of the plurality of contacts (user information 218 of the respective user of the social networking service). The social networking system, when determining the set of images to include the personalized video, may retrieve the other images from the respective social network databases. Alternatively, in some embodiments, the social networking system stores a location of the other images (e.g., at a third-party server).

After determining the set of images to include in the personalized video, the social networking system may position each image of the set of images at a designated position in the personalized video. The set of images may be equal in number to a number of image slides included in the personalized video. Moreover, the personalized video may include one or more scenes. For example, a first scene may present a profile picture(s) of the user and profile pictures of contacts of the user, while a second scene may present group images of the user with other users of the social networking service (e.g., contacts of the user and the user). FIGS. 4A-4J illustrate the personalized video as it is viewed on a client device (e.g., client device 300, FIG. 3).

FIG. 4A illustrates an initial image slide 402 of a personalized video for a user of the social networking system. The initial slide 402 includes a first image 404 from the set of images. In some embodiments, the first image 404 may be a profile picture of the user. A profile picture is an image (e.g., selected by the user) used to identify the user while participating on the social networking service (e.g., the image may be displayed in a header portion of the user's account page). The profile picture may be displayed with interactions (e.g., each interaction) on the social networking service by the user (e.g., the image may be displayed as part of a post made by the user). In some embodiments, the first image 404 for the initial slide 402 is a current profile picture of the user. However, in some circumstances, the current profile picture of the user may not satisfy criteria for the first image slide 402 (e.g., the profile picture may be of a landscape, such as mountains). In these circumstances, the first image 404 may be a previously posted profile picture of the user (e.g., the social networking system, when determining the set of images to include in the personalized video, may analyze each profile picture of the user posted over a period time and may select one of the profile pictures that satisfies the criteria for the first image slide 402). In some embodiments, the first image 404 may be an image posted by another user of the social networking service in which the user is tagged (e.g., the other user identified the user in the image or image recognition software identified the user in the image). For example, the first image 404 may be a portrait photograph of the user posted by another user of the social networking service.

In some embodiments, the initial image slide 402 is presented subsequent to one or more text slides. For example, a first text slide may identify the user of the social networking service (e.g., user is named Jeffrey, the first text slide may state "Hi Jeffrey").

During presentation of the personalized video on the client device, subsequent slides may be placed on top of previous slides (e.g., text slide 408 overlays the initial slide 402). As such, arrows (e.g., arrow 406) represent points in time when a new slide is added in the personalized video. In some embodiments, the personalized video may depict a person (e.g., a person's hand) placing a subsequent slide on top of a previous slide (not shown). Subsequent slides may be placed at different orientations from previous slides. In this way, the slides appear to form a stack of slides during the video. One skilled in the art will appreciate that various presentations methods may be used (e.g., a book having each slide on a page or simply display of the respective slides individually).

FIG. 4B illustrates a text slide 408 that may separate the initial slide 402 from subsequent slides. In some embodiments, text on the text slide 408 is associated with a subsequent image slide and/or the next scene in the personalized video. For example, the text slide 408 may state "Here are your friends" and a subsequent image slide may be an image of a friend (e.g., a contact) of the user. Moreover, the next scene in the personalized video may be profile pictures of contacts of the user.

FIGS. 4C-4D illustrate profile picture image slides of respective contacts the user. FIG. 4C illustrates a first profile picture slide 412 of a first contact of the user. In some embodiments, the first profile picture slide 412 includes a second image 413 from the set of images. The social networking system may select the first contact from the plurality of selected contacts. Furthermore, in some embodiments, the first contact may be selected at random from the plurality of selected contacts. Alternatively, in some embodiments, the first contact may be selected in accordance with a determination that the first contact is the closest contact of the user (by evaluating connection information and entity information as discussed above).

In some embodiments, the second image 413 is a current profile picture of the first contact. However, in some circumstances, the current profile picture of the first contact may not satisfy criteria for the second image slide 412 (e.g., the profile picture may be of a landscape such as mountains). In these circumstances, the second image 413 may be a previously posted profile picture of the first contact (e.g., the social networking system, when determining the set of images to include in the personalized video, may analyze each profile picture of the first contact posted over a period time and may select one of the previously posted profile pictures that satisfies the criteria for the first image slide 412).

FIG. 4D illustrates a second profile picture slide 414 of a second contact of the user. The second profile picture slide 414 includes a third image 415 from the set of images. The social networking system may select the second contact from the plurality of selected contacts. Furthermore, in some embodiments, the second contact may be selected at random from the plurality of selected contacts. Alternatively, in some embodiments, the second contact may be selected in accordance with a determination that the second contact is the second closest contact of the user (by evaluating connection information and entity information as discussed above) or is otherwise related to scene of the personalized video.

In some embodiments, the third image 415 is a current profile picture of the second contact. However, in some circumstances, the current profile picture of the second contact may not satisfy criteria for the third image slide 414 (e.g., the profile picture may be of a landscape such as mountains). In these circumstances, the third image 415 may be a previously posted profile picture of the second contact (e.g., the social networking system, when determining the set of images to include in the personalized video, may analyze each profile picture of the second contact posted over a period time and may select one of the previously posted profile pictures that satisfies the criteria for the second image slide 414).

In some embodiments, although not shown, the personalized video 400 may include one or more additional profile picture slides after the profile picture slide 414. The one or more images included in the additional profile picture slides may be selected in accordance with the discussion above. Furthermore, the criteria discussed above with reference to the first, second, and third image slides may be based, at least in part, on first metrics and/or second metrics. The first and second metrics are discussed in further detail below with reference to FIG. 5.

FIG. 4E illustrates a text slide 416 that may separate the profile picture slides (e.g., slides 412 and 414) from subsequent image slides. In some embodiments, text on the text slide 416 is associated with a subsequent image slide and/or the next scene in the personalized video. For example, the text slide 416 may state "You've done a lot together" and the subsequent image slide may be an image of one or more friends (e.g., contacts) with the user. Moreover, the next scene in the personalized video may be for group photos.

FIGS. 4F-4G illustrate group picture slides of users of the social networking service and the user. In some embodiments, the users of the social networking service are contacts of the user. The social networking system may evaluate a closeness of relationship between the users of the social networking service and the user when selecting the images for the set of images. For example, the social networking system may determine a number of edges connecting the user (e.g., a first node) and a respective user of the social networking service (e.g., a second node). In this way, the social networking system may determine which users of the social networking service have a relationship with the user (i.e., the personalized video should include images of close friends of the user).

FIG. 4F illustrates a first group picture slide 418 of a first group picture. The first group picture slide 418 includes a fourth image 419 from the set of images. In some embodiments, the social networking system, when determining the set of images to include in the personalized video, may analyze a plurality of group photos in the stored images of the user and may select one of the group photos that satisfies a criteria for the first group picture slide 418. In some embodiments, the fourth image 419 includes at least a plurality of people in the image (e.g., the user and at least one other user of the social networking service). Furthermore, the fourth image 419 may have a limited number of people in the image (e.g., the user and no more than three other users of the social networking service).

FIG. 4G illustrates a second group picture slide 420 of a second group picture. The second group picture slide 420 includes a fifth image 421 from the set of images. In some embodiments, the social networking system, when determining the set of images to include in the personalized video, may analyze the plurality of group photos in the stored images of the user and may select one of the group photos that satisfies a criteria for the second group picture slide 420. In some embodiments, the fifth image 421 includes at least a plurality of people in the image (e.g., the user and at least one other user of the social networking service). Furthermore, the fifth image 421 may have a limited number of people in the image (e.g., the user and no more than three other users of the social networking service). In some embodiments, the fourth image 419 and the fifth image 421 have a different number of people in the respective images. In some embodiments, the fourth image 419 and the fifth image 421 have different users of the social networking service in the respective images.

The criteria discussed above with reference to the first and second group picture slides may be based, at least in part, on first metrics and/or second metrics. The first and second metrics are discussed in further detail below with reference to FIG. 5.

FIG. 4H illustrates a text slide 422 that may separate the group picture slides (e.g., slides 416 and 418) from subsequent slides. In some embodiments, text on the text slide 422 may be associated with a subsequent image slide and/or the next scene in the personalized video. For example, the text slide 422 may state "Remember this?" and the subsequent image slide may be an image of a memory of the user. Moreover, the next scene in the personalized video may be for images of various memories of the user.

FIG. 4I illustrates a memory image slide 424 of a memory image associated with the user. The memory slide 424 may include a sixth image 425 from the set of images. The social networking system may designate an image as a memory image when an image satisfies neither criteria for profile pictures or group images. In some embodiments, the social networking system may designate an image as a memory image based on one or more factors. The one or more factors may include a location associated with the image. For example, a locational tag associated with the image may signal to the social networking system that the image was taken (e.g., captured) away from the user's home (i.e., the image was taken on a trip or an outing). The one or more factors may include an image type. For example, a scenic image (e.g., a landscape of mountains) may signal to the social networking system that the image was taken on a trip or on an outing (e.g., during a hike). The one or more factors may include feedback for an image. For example, the social networking system may designate an image as a memory based on a comment on the image by another user of the social networking service (e.g., an image of a dinner party at the user's home with a comment saying "Thanks for having us over last night!").

In some embodiments, the social networking system may overlay information 426 associated with the sixth image 425 on the memory image slide 424. For example, the social networking system may overlay one or more comments associated with the sixth image 425 (e.g., comment stating "Thanks for having us over last night!"). Moreover, the information 426 may include an identifier of the person who provided the comment. For example, the information 426 may include an account identity of the user of the social networking service who provided the comment (e.g., John Smith). Furthermore, the information 426 may include a profile picture of the user of the social networking service (e.g., a profile picture for John Smith).

FIG. 4J illustrates a group picture slide 428 of a final group picture. The group picture slide 428 may include a seventh image 429 from the set of images. In some embodiments, seventh image 429 is positioned at a designated position in the personalized video (e.g., at a final image slide in the personalized video). In some embodiments, the seventh image 427 has a threshold number of people in the photo (e.g., the threshold number of people may be at least five users of the social networking service, including the user).

Although the selected images (e.g., profile picture 404, first profile picture 413, etc.) are shown with a white border, other forms of image slides may be included in the personalized video. For example, the image slides may not have a border surrounding the selected images. In another example, one or more of the image slides may include a video or a 360° virtual reality image posted by the user and/or other users (e.g., a video of the user with a plurality of contacts of the user). In addition, the group picture slide 428 may be followed by one or more additional slides (e.g., one or more text slides and/or other image slides).

FIGS. 5A-5D are flow diagrams illustrating a method 500 of generating a personalized video for a user of a social networking service in accordance with some embodiments. The steps of the method 500 may be performed by any combination of client device (e.g., a client device 104, FIG. 1; client device 300, FIG. 3) and/or social networking system (e.g., social network system 108, FIG. 1; server system 200, FIG. 2). FIGS. 5A-5D correspond to instructions stored in a computer memory or computer readable storage medium (e.g., memory 206 of the server system 200; memory 306 of the client device 300). For example, the operations of method 500 are performed, at least in part, by a social network server module (e.g., social network server module 226, FIG. 2) and/or client application modules (e.g., client application modules 336, FIG. 3).

In performing the method 500, the social networking system may generate (502) a personalized video for a user of a social networking service. The social networking system, for a plurality of images associated with the user, may determine respective metrics (e.g., first metrics and/or second metrics) for respective images of the plurality of images. In some embodiments, the social networking system stores the plurality of images associated with the user (e.g., stores the images in social network database 214, FIG. 2). A user of the social networking service provided by the social networking system may provide (e.g., post) the plurality of images to the social networking service. Alternatively or in addition, other users of the social networking service may provide one or more images for the plurality of images. Providing and storing the plurality of images is discussed in further detail with reference to FIGS. 4A-4J above.

In some embodiments, the social networking system may (504) determine respective first metrics for respective images of the plurality of images based on one or more predefined image-content criteria. In some embodiments, the social networking system may determine the first metrics for the respective images of the plurality of images using image recognition software. In some embodiments, the image recognition software may be part of a third-party server. In some embodiments, the image recognition software may be part of the social networking system (e.g., image analyzing module 224, FIG. 2). Those skilled in the art will appreciate that various image recognition programs may be used to analyze the plurality of images.

In some embodiments, the one or more predefined image-content criteria (506) comprise at least one of whether an image includes people and a portion of an image occupied by one or more people. For example, the one or more predefined image-content criteria may favor images from the plurality of images having people. Moreover, the one or more predefined image-content criteria may favor images having people who are recognizable in the images. In some embodiments, the one or more predefined image-content criteria include whether an image includes an animal (e.g., a pet such as a cat or dog). In some embodiments, the one or more predefined image-content criteria include whether an image includes an infant. The social networking system may favor, for at least some of the plurality of images, images having a single person (e.g., profile pictures having a single person in the image). The social networking system may favor, for at least some other of the plurality of images, images having a plurality of people (e.g., group photos). For example, images having between two and four people may be favored. In another example, images having at least five people may be favored.

In some embodiments, the one or more predefined image-content criteria (508) comprise a degree to which a subject of an image is obstructed. As used herein, a subject may be a user of the social networking service, non-users of the social networking service, an infant, and/or an animal such as a cat or a dog. The one or more predefined image-content criteria may favor images that lack obstructions of the subject(s) of the image. For example, the social networking system may not favor an image of a contact of the user that is partially obstructed by an object or another person. As such, respective first metrics for obstructed images may be modified (e.g., reduced) in accordance with a degree of obstruction.

In some embodiments, the one or more predefined image-content criteria (510) comprise a criterion favoring photographs over synthetic images. A synthetic image may be an image that is computer generated as opposed to an image that is captured by a camera (e.g., captured by an image capture device 324 of the client device 300, FIG. 3). A photograph is an example of an image. As such, respective first metrics for synthetic images may be modified (e.g., reduced) by a predetermined amount (e.g., degree).

In some embodiments, the one or more predefined image-content criteria (512) comprise whether an image is a portrait. A portrait may be a photograph with a subject that satisfies (e.g., fills) a first threshold percentage of the photograph but does not exceed (e.g., fill) a second threshold percentage (e.g., a close-up image of the subject). In some embodiments, the first and second threshold percentages may vary depending on a number of subjects in the photograph. For example, an image may be deemed a portrait when the image includes say, for example, two subjects. In such a situation, the threshold percentages are decreased accordingly. In some embodiments, the social networking system may favor, for at least some other of the plurality of images, portrait images (e.g., profile pictures that are portraits of the subject may be favored for a particular scene). In some embodiments, the social networking system may not favor portrait images for at least some other of the plurality of images.

In some embodiments, the one or more predefined image-content criteria may comprise whether an image includes one or more users of the social networking service. For example, the one or more predefined image-content criteria may favor images having users of the social networking service (e.g., a user may be tagged (i.e., identified) in the image either by a user of the social networking service and/or by the recognition software). As such, respective first metrics for images with one or more users of the social networking service may be modified (e.g., increased) by a first predetermined amount. Furthermore, the one or more predefined image-content criteria may comprise whether an image includes one or more contacts of the user. For example, the one or more predefined image-content criteria may favor an image with one or more contacts of the user over images with users of the social networking service. As such, respective first metrics for images with one or more contacts of the user may be modified (e.g., increased) by a second amount. In some embodiments, the second amount may be greater than the first amount. The first and second amounts may be predetermined amounts.

In some embodiments, the one or more predefined image-content criteria may comprise whether an image satisfies general image quality criteria. For example, the one or more predefined image-content criteria may favor images that are in focus, are properly exposed, and use a film speed that satisfies a threshold film speed.

In some embodiments, when determining the first metrics for the plurality of images, the social networking system may use one or more coefficients (e.g., coefficients a and b) to weight (e.g., increase, normalize, or reduce) a respective predefined image-content criterion of the one or more predefined image-content criteria associated with the first metric. For example, the social networking system may favor images that are portraits. As such, the social networking system may modify (e.g., using coefficient a) the first metric for each portrait image to increase a probability of a portrait image being selected. In another example, the social networking system may disfavor images that are landscapes. In this example, the social networking system may modify (e.g., using coefficient b) the first metric for each landscape image to reduce a probability of a landscape image being selected.

In some embodiments, the one or more coefficients may be scene specific. In some embodiments, the social networking system may weight one or more of the predefined image-content criteria in selecting images for certain scenes. For example, the social networking system may favor certain of the image-content criteria when selecting, say, profile pictures. Using this example, the social networking system may modify (e.g., using coefficient a) the first metric for each portrait image to increase a probability of a portrait image being selected in a profile picture scene of the personalized video.

In some embodiments, the social networking system may determine (514) respective second metrics for the respective images of the plurality of images based on feedback for the respective images provided by users of the social networking service. In some embodiments, the feedback for determining the second metrics may include one or more feedback criteria. In some embodiments, the one or more feedback criteria include likes, comments, and shares of the respective images by users of the social networking service (516). For example, a first image of the plurality of images may be selected over a second image over the plurality of images when the first image includes likes, comments, and/or shares and the second image does not (or the second image has a smaller number of likes, comments, and/or shares relative to the first image). In some embodiments, the social networking system may select at least one image for the first set of images having one or more comments.

In some embodiments, the one or more feedback criteria may include a degree of interaction between the user and other users of the social networking service providing feedback on the respective image (516). The degree of interaction may be related to a number of likes, comments, shares, and/or personal messages between the user and another user of the social networking service. Alternatively or in addition, the degree of interaction may include whether the user and a respective other user of the social networking service are contacts (i.e., friends on the social networking service). Evaluating closeness of relationships between contacts of the user and the user is discussed in further detail above with reference to FIGS. 2 and 4 (e.g., discussion of edges and nodes).

In some embodiments, when determining the second metrics for the plurality of images, the social networking system may use one or more coefficients (e.g., coefficients c and d) to weight (e.g., increase, normalize, or reduce) a respective feedback criterion of the one or more feedback criteria. For example, the social networking system may favor likes, comments, and/or shares from contacts of the user (as opposed to comments, likes, and/or shares from non-contacts of the user). As such, the social networking system may modify (e.g., using coefficient c) the second metric for each image of the plurality of images having comments, likes, and/or shares from contacts of the user to increase the probability of those images being selected. In another example, the social networking system may favor images showing close contacts (e.g., close friends) of the user as opposed to non-close contacts of the user. Closeness may be determined, for example, based on degrees of interaction (e.g., amounts and/or frequencies of comments, likes, shares, messages, tagging in posts, etc.) between users, numbers of contacts in common, common interests, common backgrounds (e.g., school, employment), and the like. In this example, the social networking system may modify (e.g., using coefficient d) the second metric for each image of the plurality of images associated with close-contacts of the user to increase a probability of those images being selected. Evaluating closeness of relationships between contacts of the user and the user is discussed in further detail above with reference to FIGS. 2 and 4 (e.g., discussion of edges and nodes).

In some embodiments, the social networking system may specify (518) a number of image slots (e.g., slides) available in the personalized video. Furthermore, the social networking system may specify a number of images in the first set of images that equals the number of image slots available in the personalized video. Furthermore, the social networking system may generate one or more text slides associated with scenes of the personalized video. For example, the social networking system may intersperse one or more text slides with the first set of images in the personalized video. The social networking system may specify the number of image slides available in the personalized video before generating the personalized video.

In performing the method 500, the social networking system may select (520) a first set of images from the plurality of images based at least in part on the respective first metrics. In some embodiments, the first set of images may include a first subset of images designated for a first scene in the personalized video, a second subset of images designated for a second scene in the personalized video, a third subset of images designated for a third scene in the personalized video, and so on. The first subset of images in the personalized video may include profile pictures. The second subset of images may include group photos not exceeding a threshold number of subjects in the images (or may include group photos that exceed a threshold number of subjects in the images). The third subset of images may include photos that are designated as memories. It should be noted that the scenes may be ordered in various sequences by the social networking system.

In some embodiments, the social networking system, when selecting the first set of images from the plurality of images, may select (522) a profile picture of the user. In some embodiments, the profile picture is a current profile picture of the user (e.g., the profile picture currently representing the account of the user on the social networking service). In some circumstances, the user may have provided (e.g., posted) a plurality of profile pictures over a period of time (e.g., a year). In these circumstances, the social networking system may determine respective metrics (e.g., first and/or second metrics) for the plurality of profile pictures and may select a respective profile picture of the plurality of profile pictures based, at least in part, on the respective metrics (i.e., the user's current profile picture may not, in some circumstances, be chosen by default). In some embodiments, the profile picture of the user may be selected in accordance with the determined metrics (e.g., first and/or second metrics).

Furthermore, in some embodiments, the social networking system, when selecting the first set of images from the plurality of images, may select (524) one or more profile pictures of contacts of the user. In some embodiments, the one or more profile pictures of contacts of the user are respective current profile pictures of the contacts of the user. In some circumstances, a respective contact of the user may have provided (e.g., posted) a plurality of profile pictures over a period of time. In these circumstances, the social networking system may determine respective metrics (e.g., first and/or second metrics) for the plurality of profile pictures and may select a respective profile picture of the plurality of profile pictures based, at least in part, on the respective metrics (i.e., the respective contact's current profile picture may not, in some circumstances, be chosen by default). In some embodiments, the one or more profile pictures of the contacts of the user are selected in accordance with the determined metrics (e.g., first and/or second metrics).

In some embodiments, the first set of images may include one or more profile pictures of the user and one or more profile pictures of contacts of the user. In some embodiments, the profile picture of the user and/or the one or more profile pictures of the contacts of the user may be part of a first scene of the personalized video. For example, the first scene of the personalized video may include a profile picture of the user and one or more profile pictures of contacts of the user.

In some embodiments, the social networking system, when selecting the first set of images from the plurality of images, may select (526) an image showing one or more contacts of the user (or may select an image showing one or more users of the social networking service). For example, the one or more contacts may have been tagged in the image or identified in the image by image analysis software. In response to selecting an image showing one or more contacts of the user, the social networking system may modify (528) the first metric for another image showing any of the one or more contacts to reduce a probability of the other image showing the one or more contacts being selected. In some embodiments, the social networking system may modify the first metric for another image sharing the same image type as the image (i.e., the social networking system may modify first metrics by scene). For example, the social networking system may reduce the first metric for other profile pictures showing any of the one or more contacts of the user when the selected image is also a profile picture. In some embodiments, the social networking system may flag the one or more identified contacts (e.g., the social networking system may flag an account associated with the user). In response to flagging the account of the user, the social networking system may not select another image showing the same account. In some embodiments, the flagging is limited to particular scenes (e.g., profile picture scene). In some embodiments, the social networking system may modify (e.g., reduce) the first metric for another image showing any of the one or more contacts by a third amount, which may be a predetermined amount. In some embodiments, the third amount may be greater than the first and second amounts (the first and second amounts are discussed above).

In some embodiments, the social networking system, when selecting the first set of images from the plurality of images, may select (530) an image showing a location. For example, the image may have a location tag associated with the image (e.g., a client device (e.g., client device 300, FIG. 3) may attach GPS coordinates to an image captured by the client device). In this way, the social networking system (or the client device) may associate the GPS coordinates with a location (e.g., Lake Tahoe, Calif., USA). In some embodiments, the social networking system may expand a scope of the location by an amount. For example, if the location is Lake Tahoe, then the social networking system may expand the scope to incorporate other areas surrounding Lake Tahoe. The amount of expansion may vary depending on the location (e.g., rural areas may have a greater expansion relative to expansion in urban areas, or vice versa).

In response to selecting an image showing a location, the social networking system may modify (532) the first metric for another image showing the location to reduce a probability of the other image showing the location being selected. For example, the social networking system may modify (e.g., reduce) a first metric for other images taken in the location. To continue the example from above, the social networking system may flag other images associated with the user taken in Lake Tahoe, Calif. The social networking system may modify first metrics for other images taken in the location (and the surrounding areas) so that the personalized video shows images from various locations. In some embodiments, the social networking system may modify (e.g., reduce) the first metric for other images taken in the location by a fourth amount, which may be a predetermined amount.

In some embodiments, the social networking system, when selecting the first set of images from the plurality of images, may select (534) a first image having a first timestamp falling within a first period of time. For example, the social networking system may select one or more images that were taken (e.g., captured) during the first period of time. The period of time may be, for example, over a holiday weekend or a week during a given month of the year.

In response to selecting the first image having the first timestamp falling within the first period of time, the social networking system may modify (536) the first metric for a second image having a second timestamp falling within the first period of time to reduce a probability of the second image being selected. In some embodiments, the social networking system may modify (e.g., reduce) the first metric for the second image having the second timestamp falling within the first period of time by a fifth amount, which may be a predetermined amount.

In some embodiments, the social networking system may modify the first metric for a third image having a third timestamp falling within a second period of time to reduce a probability of the second image being selected. In some embodiments, the second period of time is a period of time near the first period of time. For example, if the first period of time is a week during the middle of January, 2015, then the second period of time may be the other weeks in January 2015. In some embodiments, the social networking system may reduce the first metric for the second image by a first amount and may reduce the first metric for the third image by a second amount (e.g., the first amount may be greater than the second amount).

In some embodiments, the social networking system, when selecting the first set of images from the plurality of images, may select an image showing a location and one or more contacts of the user (and/or a first timestamp in a first period of time). In response to selecting an image showing a location and having the one or more contacts of the user, the social networking system may modify the first metric for another image showing the location and any of the one or more contacts to reduce a probability of the other image showing the location and the one or more contacts being selected. In some embodiments, the social networking system may modify (e.g., reduce) the first metric by a sixth amount, which may be a predetermined amount. The sixth amount may be greater than the first, second, third, fourth, and fifth amounts.

In some embodiments, the social networking system may select (538) the first set of images based further, at least in part, on the second metrics. For example, the social networking system may consider the second metrics as an alternative to or in addition to the first metrics when selecting the first set of images for the personalized video. Furthermore, the social networking system, when selecting the first set of images, may rank (540) the plurality of images using the respective first metrics and/or the respective second metrics. Moreover, the social networking system may form a respective subset of images designated for a respective scene in the personalized video from the plurality of images (e.g., the respective subset of images may be profile pictures). Thereafter, the social networking system may rank the respective subset of images using the respective first metrics and/or the respective second metrics.

Additionally, the social networking system may choose (542) images for the first set of images from the plurality of images in accordance with the ranking. For example, the social networking system may choose, say, ten images having the highest rank for the personalized video. In circumstances where the social networking system formed the respective subset of images (or multiple respective subsets of images), the social networking system may choose images for the first subset of images from the plurality of images in accordance with the ranking of the respective subset of images.

In some embodiments, the social networking system, when selecting the first set of images, may select (544) at least one image having one or more comments. For example, the social networking system may select a first image (e.g., an image of the user on vacation in location X) over a second image (e.g., another image of the user on vacation in location X) when the first image includes one or more comments from contacts of the user (or simply other users of the social networking service). In some embodiments, the social networking system may select an image with two or more comments.

In some embodiments, the social networking system may overlay at least one of the one or more comments on the selected image (step 556). For example, the social networking system may overlay the at least one comment on a portion of the selected image (e.g., information 426, FIG. 4I). In some embodiments, the social networking system may overlay the at least one comment on a first portion of the selected image, and subsequently translate the at least one comment to a second portion of the selected image while the selected image is displayed in the personalized video. In circumstances where the social networking system selects an image with two or more comments, the social networking system may overlay a first comment of the two or more comments in a first portion of the selected image and may overlay a second comment of the two or more comments in a second portion of the selected image. Alternatively, the social networking system may overlay the first comment in a first portion of the selected image, subsequently translate the first comment to a second portion of the selected image (or translate the first comment such that is disappears during the video), and may overlay the second comment in the first portion of the selected image. This process may be repeated if the image includes three or more comments.

In some embodiments, the social networking system may analyze a comment prior to overlaying the comment on the image. For example, when an image includes, say, five comments, the social networking system may analyze the comments to determine the relevance of each comment to the image. Moreover, the social networking system may not overlay one or more comments of the five comments associated with an image based on content of the one or more comments.

In some embodiments, when selecting the first set of images, the social networking system may select a plurality of group images that each comprises the user and a plurality of other users of the social networking service. In some embodiments, the plurality of other users of the social networking service includes one or more contacts of the user. In some embodiments, the plurality of group images may be part of a second scene of the personalized video.

In some embodiments, when selecting the first set of images, the social networking system may select (546) a group image that comprises the user and a plurality of other users of the social networking service. In some embodiments, the group image differs in some respect from the plurality of selected group images (e.g., fewer subjects in the plurality of selected group images). In some embodiments, the plurality of other users of the social networking service includes one or more contacts of the user. In some embodiments, the group image includes a mixture of other users of the social networking service and contacts of the user.

In some embodiments, the social networking system may select (548) images from the first set of images showing respective numbers of people below a threshold number of people. In some embodiments, the selected images showing the respective numbers of people below the threshold number of people are part of a first group scene in the personalized video. For example, the social networking system may select images having less than four subjects in the images.

In performing the method 500, the social networking system may populate (550) the personalized video with the first set of images. As discussed above, the social networking system may select the profile picture of the user when selecting the first set of images. Furthermore, in some embodiments, the social networking system may include (552) the profile picture of the user as an initial image slide in the personalized video when populating the personalized video with the first set of images.

As discussed above, the social networking system may select one or more profile pictures of contacts of the user. Furthermore, in some embodiments, the social networking system may include (554) the one or more profile pictures of the contacts of the user in image slides following the initial image slide in the personalized video. In some embodiments, the first set of images may include a first subset of images designated for a first scene in the personalized video. In some embodiments, the first scene is a profile picture scene (e.g., the social networking system may populate the first scene with the profile picture of the user as an initial image slide and may also populate the first scene with the one or more profile pictures of the contacts of the user in image slides following the initial image slide).

In some embodiments, populating the personalized video comprises including the plurality of group images that each comprises the user and the plurality of other users of the social networking service.

In some embodiments, populating the personalized video comprises including the group image in a slide at a designated position in the personalized video (558). In some embodiments, the slide at the designated position is a final image slide in the personalized video (560). Furthermore, in some embodiments, the social networking system sets a threshold number of users (and/or contacts of the users) required for the group image at the designated position. Consequently, in accordance with a determination that the group image does not satisfy the threshold, the social networking system may select another group image when selecting the first set of images. Alternatively, in accordance with a determination that the group image satisfies the threshold, the social networking system populates the slide at the designated position with the group image. In some embodiments, the threshold is at least four other users of the social networking service (and/or contacts of the user) (562).

In performing the method 500, the social networking system may provide (564) the personalized video to the user for viewing. For example, the social networking system may provide the personalized video to a client device (e.g., client device 300, FIG. 3) associated with the user of the social networking service. The personalized video may be displayed on a display of the client device. In some embodiments, the social networking system provides the personalized video at a specified time and/or date (e.g., on an anniversary). In some embodiments, the social networking system may provide the personalized video to the user in response to receiving a request.

In some embodiments, the social networking system may select a second set of images from the plurality of images based at least in part on the respective metrics. In some embodiments, the second set of images may be alternatives to the first set of images. For example, the social networking system may provide the second set of images to the client device and a user may edit the personalized video, via the client device, by replacing one or more images from the first set of images with one or more images from the second set of images.

In some embodiments, the second set of images may be selected based at least in part on respective first metrics and/or second metrics, as discussed above with reference to selecting the first set of images. In some embodiments, the second set of images may include a first subset of images designated for a first scene in the personalized video, a second subset of images designated for a second scene in the personalized video, a third subset of images designated for a third scene in the personalized video, and so on. A respective subset of images for the second set of images may be associated with a respective subset of images for the first set of images. For example, a first subset of images for the first set of images may include images populated in the personalized video and a first subset of images for the second set of images may be presented as alternatives to the first subset of images for the first set of images. In some embodiments, a respective subset of images for the second set of images for a scene may include a first group of images and a second group of images. The social networking system may provide the first group of images for the respective subset to the client device when providing the personalized video to the client device (e.g., the plurality of suggested images 612, FIG. 6A). The social networking system may provide the second group of images to the client device in response to a request for additional images from the client device.

In some embodiments, the social networking system, when selecting the second set of images from the plurality of images, may rank the plurality of images using the respective first metrics and/or the respective second metrics. Moreover, the social networking system may form a respective subset of images designated for a respective scene in the personalized video from the plurality of images (e.g., the respective subset of images may be profile pictures). Thereafter, the social networking system may rank the respective subset of images using the respective first metrics and/or the respective second metrics. Additionally, the social networking system may choose more images for the second set of images (in addition to the first set of images) from the plurality of images in accordance with the ranking. For example, the social networking system may choose a number of images having the highest rank for the personalized video (or for a respective scene) for the first set of images and may also choose an additional number of images for the second set of images having rankings below the images chosen for the first set of images. As discussed above, the social networking system may divide the additional images into a first group of images and a second group of images. The social networking system may divide the additional messages into the respective first and second groups in accordance with the ranking. In some embodiments, the second set of images includes one or more images of the first set of images (e.g., duplicate images).

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    at a server system having one or more processors and memory storing instructions for execution by the one or more processors:
        generating a personalized video for a user of a social networking service, comprising, for a plurality of images associated with the user:
            determining, by the server system, respective first metrics for respective images of the plurality of images based on image recognition processing of the plurality of images and one or more predefined image-content criteria;
            selecting, by the server system, a first set of images from the plurality of images based at least in part on the respective first metrics, wherein selecting the first set of images from the plurality of images includes:
                selecting a first image showing a location according to the first metric of the first image; and
                in response to selecting the first image:
                    identifying a second image showing the location; and
                    modifying the first metric for the second image relative to the first metrics for other unselected images not showing the location, thereby reducing a probability the second image is selected; and
            populating the personalized video with the first set of images; and
        providing the personalized video to the user for viewing.

2. The method of claim 1, further comprising, at the server system, determining respective second metrics for the respective images of the plurality of images based on feedback for the respective images provided by users of the social networking service;
    wherein selecting the first set of images is further based, at least in part, on the second metrics.

3. The method of claim 2, wherein the feedback for determining the second metrics comprises:
    likes, comments, and shares of the respective images by users of the social networking service; and
    a degree of interaction between the user and other users of the social networking service providing feedback on the respective image.

4. The method of claim 2, wherein selecting the first set of images comprises:
    ranking the plurality of images using the respective first metrics and the respective second metrics; and
    choosing images for the first set of images from the plurality of images in accordance with the ranking.

5. The method of claim 1, wherein:
    selecting the first set of images comprises selecting a group image that comprises the user and a plurality of other users of the social networking service; and
    populating the personalized video comprises including the group image in a slide at a designated position in the personalized video.

6. The method of claim 5, wherein:
    the slide at the designated position is a final image slide in the personalized video; and
    the plurality of other users is at least four other users.

7. The method of claim 1, further comprising specifying a number of image slots available in the personalized video;
    wherein a number of images in the first set of images equals the number of image slots available in the personalized video.

8. The method of claim 1, wherein selecting the first set of images comprises:
    selecting a profile picture of the user; and
    selecting one or more profile pictures of contacts of the user.

9. The method of claim 8, wherein populating the personalized video comprises:
    including the profile picture of the user as an initial image slide in the personalized video; and including the one or more profile pictures of the contacts of the user in image slides following the initial image slide in the personalized video.

10. The method of claim 1, wherein the one or more predefined image-content criteria comprise at least one of whether an image includes people and a portion of an image occupied by one or more people.

11. The method of claim 1, wherein the one or more predefined image-content criteria comprise a degree to which a subject of an image is obstructed.

12. The method of claim 1, wherein the one or more predefined image-content criteria comprise a criterion favoring photographs over synthetic images.

13. The method of claim 1, wherein the one or more predefined image-content criteria comprise whether an image is a portrait.

14. The method of claim 1, wherein selecting the first set of further images comprises:
  selecting a third image showing one or more contacts of the user according to the first metric of third image; and
  in response to selecting the third image:
    identifying a fourth image showing one or more contacts of the user; and
    modifying the first metric for the fourth image relative to the first metrics of other unselected images not showing any of the one or more contacts of the user, thereby reducing a probability the fourth image is selected.

15. The method of claim 1, wherein selecting the first set of images further comprises:
  selecting a third image having a timestamp falling within a first period of time according to the first metric of the third image; and
  in response to selecting the third image:
    identifying a fourth image having a timestamp falling within the first period of time; and
    modifying the first metric for the fourth image relative to the first metrics of other unselected images having timestamps falling within the first period of time, thereby reducing a probability the fourth image is selected.

16. The method of claim 1, wherein selecting the first set of images comprises selecting images from the first set of images showing respective numbers of people below a threshold number of people.

17. The method of claim 1, wherein:
  selecting the first set of images comprises selecting at least one image having one or more comments; and
  populating the personalized video with the first set of images comprises overlaying at least one of the one or more comments on the selected image.

18. A server system, comprising:
  one or more processors; and
  memory storing one or more programs for execution by the one or more processors, the one or more programs including instructions for:
    generating a personalized video for a user of a social networking service, comprising, for a plurality of images associated with the user:
      determining, by the server system, respective first metrics for respective images of the plurality of images based on image recognition processing of the plurality of images and one or more predefined image-content criteria;
      selecting, by the server system, a first set of images from the plurality of images based at least in part on the respective first metrics, wherein selecting the first set of images from the plurality of images includes:
        selecting a first image showing a location according to the first metric of the first image; and
        in response to selecting the first image:
          identifying a second image showing the location; and
          modifying the first metric for the second image relative to the first metrics for other unselected images not showing the location, thereby reducing a probability the second image is selected; and
      populating the personalized video with the first set of images; and
      providing the personalized video to the user for viewing.

19. A non-transitory computer-readable storage medium, storing one or more programs configured for execution by one or more processors of a server system, the one or more programs including instructions for:
  generating a personalized video for a user of a social networking service, comprising, for a plurality of images associated with the user:
    determining, by the server system, respective first metrics for respective images of the plurality of images based on image recognition processing of the plurality of images and one or more predefined image-content criteria;
    selecting, by the server system, a first set of images from the plurality of images based at least in part on the respective first metrics, wherein selecting the first set of images from the plurality of images includes:
      selecting a first image showing a location according to the first metric of the first image; and
      in response to selecting the first image:
        identifying a second image showing the location; and
        modifying the first metric for the second image relative to the first metrics for other unselected images not showing the location, thereby reducing a probability the second image is selected; and
    populating the personalized video with the first set of images; and
    providing the personalized video to the user for viewing.

* * * * *